United States Patent
Jin et al.

(10) Patent No.: US 11,489,164 B2
(45) Date of Patent: Nov. 1, 2022

(54) HIGHLY DISPERSED SILICON-CARBON SOLID SOL, PREPARATION METHOD AND APPLICATION THEREOF

(71) Applicant: WUHAN UNIVERSITY, Wuhan (CN)

(72) Inventors: Xianbo Jin, Wuhan (CN); Yating Yuan, Wuhan (CN); Zhiyong Wang, Wuhan (CN)

(73) Assignee: WUHAN UNIVERSITY, Wuhan (CN)

(*) Notice: Subject to any disclaimer, the term of this patent is extended or adjusted under 35 U.S.C. 154(b) by 0 days.

(21) Appl. No.: 17/568,921

(22) Filed: Jan. 5, 2022

(65) Prior Publication Data

US 2022/0166028 A1 May 26, 2022

Related U.S. Application Data

(63) Continuation of application No. PCT/CN2020/102331, filed on Jul. 16, 2020.

(30) Foreign Application Priority Data

Jul. 17, 2019 (CN) .......................... 201910645744.1

(51) Int. Cl.
  *H01M 4/134* (2010.01)
  *H01M 4/62* (2006.01)
  *H01M 4/04* (2006.01)
  *H01M 4/02* (2006.01)

(52) U.S. Cl.
  CPC ......... *H01M 4/625* (2013.01); *H01M 4/0433* (2013.01); *H01M 4/134* (2013.01); *H01M 2004/021* (2013.01); *H01M 2004/027* (2013.01)

(58) Field of Classification Search
  CPC .... H01M 4/625; H01M 4/0433; H01M 4/134; H01M 2004/021; H01M 2004/027; H01M 4/621; Y02E 60/10
  See application file for complete search history.

(56) References Cited

U.S. PATENT DOCUMENTS

2013/0234674 A1   9/2013 Nazri

FOREIGN PATENT DOCUMENTS

| CN | 103107315 A | 5/2013 |
| CN | 103436904 A | 12/2013 |
| CN | 104294314 A | 1/2015 |
| CN | 106591891 A | 4/2017 |
| CN | 108011084 A | 5/2018 |

(Continued)

OTHER PUBLICATIONS

Internation Search Report of PCT/CN2020/102331, dated Oct. 23, 2020.

(Continued)

*Primary Examiner* — Cynthia K Walls (57) ABSTRACT

A highly dispersed silicon-carbon solid sol, a preparation method and application thereof. In the high-dispersion silicon-carbon solid sol, the silicon is a dispersed substance, the carbon is a dispersion medium. The silicon is covered by a continuous carbon layer or buried in a continuous carbon phase; a size of the silicon is less than 80 nm at least in one of dimensions, and a mass percentage of the silicon in the highly dispersed silicon-carbon solid sol is 5% to 90%. The nano-silicon particles are covered by the continuous carbon phase, which is not only conducive to obtaining nano-silicon particles with very small sizes, but also can effectively prevent the late oxidation of nano-silicon.

12 Claims, 3 Drawing Sheets

(56) References Cited

FOREIGN PATENT DOCUMENTS

| CN | 109763134 A | 5/2019 |
| CN | 109811368 A | 5/2019 |
| CN | 110459769 A | 11/2019 |
| WO | 2012165017 A1 | 12/2012 |

OTHER PUBLICATIONS

"Efficient Nanostructuring of Silicon by Electrochemical Alloying/Dealloying in Molten Salts for Improved Lithium Storage", «Angew. Chem. Int.Ed.», vol. 57, Oct. 10, 2018, pp. 15743-15748.

HIGHLY DISPERSED SILICON-CARBON SOLID SOL, PREPARATION METHOD AND APPLICATION THEREOF

CROSS-REFERENCE TO RELATED APPLICATIONS

This application is a continuation of International Patent Application No. PCT/CN2020/102331 with a filing date of Jul. 16, 2020, designating the United States, and further claims priority to Chinese Patent Application No. 201910645744.1 with a filing date of Jul. 17, 2019. The content of the aforementioned applications, including any intervening amendments thereto, are incorporated herein by reference.

TECHNICAL FIELD

The present disclosure relates to field of energy materials and manufacturing technology, and more particularly relates to a highly dispersed silicon-carbon solid sol, a preparation method and application thereof.

BACKGROUND

Nano-silicon has important application prospects in lithium battery anode materials. However, due to the huge expansion of silicon during intercalating lithium, it is prone to pulverization and difficult to form a stable electrode/electrolyte interface. Current commercial nano-silicon materials are still too large in size therefore cannot meet the requirements of high-capacity anodes. It was reported that combining nano-silicon and carbon can help to relief the expansion problem, and the combination currently includes two ways. The first way is to mix separately prepared nano-silicon and carbon powder, so that the silicon is dispersed in the porous carbon structure, or the nano-silicon particles are grown on the surface of carbon, etc. Another way is to coat the surface of nano-silicon with carbon through pyrolysis, CVD (chemical vapor deposition), etc. Although the cycle stability of the two composite materials is improved compared with pure silicon, the improvement is far from enough. The reason is that the size of the silicon particles in the material is too large, or the surface of the silicon particles is seriously oxidized, and the existing preparation methods are difficult to solve these problems. For example, the size of nano silicon powder prepared by the ball milling method is sub-micron; the size of the nano silicon powder prepared by the chemical vapor deposition method is about 80 nanometers due to the limitation of operating temperature. In other methods reported, smaller-sized nano-silicon can be theoretically obtained by methods such as metal thermal reduction of silicon tetrachloride, etc., or oxidation of magnesium silicide, etc., but it is inevitable to expose the nano-silicon product to an oxidizing environment for a long time during the preparation or subsequent collecting and processing processes. In these situations, the high active ultra-fine nano-silicon often oxidizes seriously. Therefore, the performance of the silicon carbon composite materials prepared by the existing methods is poor.

It can be seen that the development of silicon-based anode materials must first obtain nano-silicon with smaller particle sizes. With reference to the current commercial nano-silicon, the particle size should be less than 80 nm. In previous attempts to obtain smaller-sized nano-silicon, what is directly prepared is the mixture of silicon and other by-products. For example, the direct product generated by the reduction of $SiO_2$ by magnesium is a mixture of MgO and nano-silicon, which may be beneficial to obtain smaller-sized nano-silicon. But the removal of MgO will inevitably lead to the exposure of nano-silicon to an oxidizing environment (*Nano Energy*, 2016, 20, 68-75). If the "by-product" is carbon, it may not need to be removed. In particular, if the obtained ultrafine nano-silicon particles are buried in the continuous carbon phase, it may be possible to effectively prevent the nano-silicon from oxidation. That is, even the nano-silicon in such a silicon-carbon composite material has a very small size, it would not be oxidized, so it is expected to meet the requirements of lithium-ion batteries for high-capacity and high-cycle stability anode material. This material can be regarded as a kind of silicon-carbon solid sol with ultra-fine nano silicon particles being coated by a continuous carbon layer, or Si colloidal particles dispersing in a continuous carbon phase. It has not been reported in prior arts, and the existing preparation methods are also difficult to prepare this highly dispersed silicon-carbon solid sol.

SUMMARY

The first objective of the present disclosure is to provide a highly dispersed silicon-carbon solid sol. The silicon has a small particle size and is difficult to be oxidized such that the silicon-carbon solid sol meets the requirements of lithium ion batteries for high capacity and high cycle stability anode materials.

The second objective of the present disclosure is to provide a method for preparing the highly dispersed silicon-carbon solid sol, which does not have strict requirements on the particle size of the raw materials, has high yield and low energy consumption during the preparation process, and has obvious advantages compared with other preparation methods of nano silicon carbon composites.

The third objective of the present disclosure is to provide an application of the highly dispersed silicon-carbon solid sol as an anode material in a lithium battery.

The solution adopted by the present disclosure to achieve the first objective is: a highly dispersed silicon-carbon solid sol, wherein the silicon is a dispersed substance, the carbon is a dispersion medium, and the silicon is covered by a continuous carbon layer or buried in a continuous carbon phase; a size of the silicon is less than 80 nm at least in one of dimensions, and a mass percentage of the silicon in the highly dispersed silicon-carbon solid sol is 5% to 90%.

Preferably, the silicon is at least one of nanoparticle, one-dimensional nanowire, and two-dimensional nanosheet; and a morphology of the highly dispersed silicon-carbon solid sol is at least one of nanoparticle, microparticle, rod, and rod cluster.

Preferably, the size of the silicon in one of the dimensions is between 3 and 60 nm.

The solution adopted by the present disclosure to achieve the second objective is: a method for preparing the highly dispersed silicon-carbon solid sol, comprising following steps:

(1) preparing a solid-state composite electrode of metal carbide M1C and metal silicide M2Si;

(2) performing an anodic polarization to the solid-state composite electrode of metal carbide M1C and metal silicide M2Si under a condition of 300-750° C. to dissolve metals M1 and M2 in the metal carbide M1C and metal silicide M2Si; wherein a molten salt containing alkali halide or alkaline earth halide or a mixture of the alkali halide and the alkaline earth halide is used as an electrolyte;

(3) repeating steps (1) and (2) in sequence, taking out the polarized electrode, and removing residual molten salt to obtain the highly dispersed silicon-carbon solid sol.

Preferably, in the step (1), a method for preparing the solid-state composite electrode of metal carbide M1C and metal silicide M2Si is any one of the following (i)-(vii):

(i) mixing the M1C and M2Si, molding the mixture, and preparing the solid-state composite electrode by combining a molded body with a conductive current collector;

(ii) mixing the M1C and Si, molding the mixture, and performing a cathodic polarization to a molded body at 300-950° C. in a molten salt containing metal M2 halide to make Si react with M2 ions to obtain the solid-state composite electrode of metal carbide M1C and metal silicide M2Si;

(iii) mixing the C and M2Si, molding the mixture, and performing a cathodic polarization to a molded body at 300-950° C. in a molten salt containing metal M1 halide to make C react with M1 ions to obtain the solid-state composite electrode of metal carbide M1C and metal silicide M2Si;

(iv) mixing the M1C and Si and then chemically combining with M2, molding the combination, and preparing the solid-state composite electrode by combining a molded body with a conductive current collector;

(v) mixing the C and M2Si and then chemically combining with M1, molding the combination, and preparing the solid-state composite electrode by combining a molded body with a conductive current collector;

(vi) mixing the C and Si and then chemically combining with M, molding the combination, and preparing the solid-state composite electrode by combining a molded body with a conductive current collector;

(vii) preparing the molded bodies of Si and C sources in methods of (ii)-(vi) into a solid-state electrode, and performing a cathodic polarization to the solid-state electrode at 300-950° C. in a molten salt containing M2 halide, M1 halide or M halide to make the C and Si respectively react with M1 and M2, or to make the C and Si simultaneously react with M to obtain the solid-state composite electrode of M1C and M2Si; where M is M1 and/or M2.

In the step (1), since the alloying process of M with Si and C is spontaneous, when electrochemical method is adopted, the anode M and the cathode Si, C form a primary cell. At this time, the reaction speed can be controlled by controlling the voltage between the cathode and the anode. Theoretically, no energy input is required. Sometimes, a negative voltage can be applied to increase the reaction speed. In the subsequent step (2), additional energy must be provided. Step (1) or (2) can also be carried out by using a three-electrode system. For example, a high-temperature fully-sealed Ag/AgCl reference electrode as disclosed in patent application No. CN200420017446.7 can be used, which can stably work in molten salts of various chlorides and their mixed salts, and can be repeatedly used for a long time.

In the step (2), the metal M in the M1C and M2Si is dissolved out to generate high-activity Si and C. A lower reaction temperature can avoid the formation of silicon carbide, and at the same time, the newly formed Si and C particles are small and easy to combine with each other to reduce the surface activation energy. Meanwhile, M1C has a certain degree of solubility, and C can be further grown through dissolution and deposition, and finally the combined Si and C are connected and coated to form the silicon-carbon solid sol. The cathodic reaction in this process is the deposition of M (M1 or M2), and the deposited M (M1 or M2) can react with C and Si to prepare new M1C and M2Si solid composite electrodes. If an electrochemical method is adopted in step (1), and M1=M2=M, and metal M or its alloy is used as the counter electrode, then the actual reaction in step (1) is that M is transferred from the counter electrode to the Si and C on the cathode to form MC+MSi, and step (2) is just a process in which M leaves MC+MSi and is transferred to the counter electrode. Therefore, when the silicon-carbon composite nanomaterial is prepared by the present disclosure, the molten salt medium and the counter electrode can substantially be completely restored. It is a low-cost technology with short production process, less material and energy consumption, less pollution, simple process, and is easy to achieve large-scale production.

Preferably, in the cathodic polarization of method (vii), an anode is graphite or corresponding elementary substance or alloy of M; a cathode potential is controlled to be 0-0.3V relative to an evolution potential of the metal M; or when a constant current polarization is adopted, a polarization current is 0.1-10 A/g. A reaction electric quantity is more than the electric quantity required for alloying.

Preferably, in the method (i)-(vii), the molded body is obtained by the following preparation method: directly preparing the mixture into a porous body or preparing a porous body after mixing the mixture with an additive, the additive being any one of conductive metal powder, carbon material powder, elementary substance or compound of Groups IIIA-VIA elements of the periodic table of elements, and solid component of the molten salt; in the methods (i)-(vi), the conductive current collector is one of nickel, iron, titanium, molybdenum, and tungsten or an alloy containing any one of these elements.

In the MC and MSi solid composite electrode prepared by the methods (i)-(vii), conductive metal powder, carbon material powder, etc. can be added to increase conductivity, and at the same time, it can have an appropriate porosity. When the method (vii) is performed electrochemically, the raw material molded body must have a certain porosity, which can not only buffer the volume expansion caused by the compounding process of C, Si with M, but also promote the solid-liquid phase diffusion. Preferably, the volume of the raw material molded body is larger than the volume of the target material MC+MSi in the compact state. According to this principle, the minimum porosity of the raw material molded body can be calculated. The solid component of the molten salt can be added during molding to reserve the porosity, which will melt in the molten salt, thereby forming ion channels in the electrode. In the solid composite electrode of the methods (i)-(vii), some doping elements or their compounds can be added to dope Si, especially by using Groups IIIA-VIA elements of the periodic table of elements to dope Si to improve its conductivity.

Preferably, in the steps (1) to (3), the metal M1 is at least one of Li, Ca, Ba, Sr; the metal M2 is at least one of Li, Mg, Ca, Ba, Sr, and rare earth; the C comprises at least one of graphite, amorphous carbon, carbon nanotubes, graphene, and graphene oxide; the Si is silicon elementary substance or doped silicon.

Preferably, in the step (2), a cathode is a conductive metal or corresponding elementary substance or alloy of M, and when an anode is polarized, a voltage of 0.5-2.8 V is applied between the anode and the cathode or when a constant current polarization is adopted, a polarization current is 0.1-10 A/g; a polarization electric quantity is higher than the required capacity of the chemical reaction; in the step (3), the method of removing the residual molten salt comprises:

removing the residual molten salt by washing with water or pickling, or removing the residual molten salt by distilling in inert atmosphere or vacuum.

The solution adopted by the present disclosure to achieve the third objective is: an application of the highly dispersed silicon-carbon solid sol as an anode material of lithium ion battery.

In the highly dispersed silicon-carbon solid sol of the present disclosure, the ultrafine nano-silicon particles are buried in the continuous carbon phase. The particle size of silicon is very small and is difficult to be oxidized. It can also effectively prevent the nano-silicon from being oxidized in the later stage. Therefore, it can meet the requirements of high capacity and high cycle stability of anode materials for lithium ion batteries.

The preparation method of the present disclosure uses cheap and easy-to-obtain silicon and carbon as raw materials, and has no strict requirements on the particle size of the raw materials. The preparation process has a high yield and a low energy consumption and has obvious advantages compared with other preparations of nano silicon-carbon composites. Compared with the CVD method, the present disclosure does not require expensive silane precursors and complicated CVD equipment systems, greatly reducing production costs. Compared with traditional magnesium vapor technology, the present disclosure consumes little or no Mg metal and has no subsequent treatment problems of magnesium oxide. Compared with the electrostatic spinning method, the present disclosure does not need to prepare nanoscale silicon as raw material first, which is beneficial to reduce the production cost. Compared with the prior arts, a significant advantage of the present disclosure is that the ultrafine nano-silicon is prepared and coated with C on site, thereby simultaneously solving the problem of the preparation of ultra-fine nano-silicon and the oxidation caused by high reactivity.

The highly dispersed silicon-carbon solid sol of the present disclosure exhibits high specific capacity and good cycle stability when used as an anode material of a lithium ion battery.

DETAILED DESCRIPTION OF PREFERRED EMBODIMENTS

In order to better understand the present disclosure, the following examples are further descriptions of the present disclosure, but the content of the present disclosure is not limited to the following examples.

Example 1

(1) $CaC_2$ and $Mg_2Si$ powders are mixed by planetary ball milling at a molar ratio of 1:1.1 for 1 hour; 3 g of the mixture is taken to mold into a sheet; and the sheet is combined on a molybdenum rod current collector by a molybdenum mesh to prepare a solid state composite electrode.

(2) the solid state composite electrode is used as an anode, a molybdenum mesh electrode is used as a cathode, and a molten salt ($CaCl_2$+NaCl) at 550° C. is used as a medium, a voltage of 1.2 V is applied between the anode and the cathode for electrolysis for 5 hours to dissolve out metals Ca and Mg in the $CaC_2$ and $Mg_2Si$.

(3) the electrodes are taken out from the molten salt, cooled to room temperature, and washed with water and dried in vacuum to obtain a silicon-carbon solid sol with a silicon content of about 60%. The particle size of silicon is approximately 30 nm according to XRD.

Example 2

(1) CaC2, $Mg_2Si$ powders and 300 mesh graphite powder are mixed by planetary ball milling at a molar ratio of 1:1:1; 3 g of the mixture is taken to mold into a sheet; and the sheet is combined on a molybdenum rod current collector by a molybdenum mesh to prepare a solid state composite electrode.

(2) the solid state composite electrode is used as an anode, a molybdenum mesh electrode is used as a cathode, and a molten salt ($CaCl_2$+NaCl) at 550° C. is used as a medium, a voltage of 1.2 V is applied between the anode and the cathode for electrolysis for 5 hours to dissolve out metals Ca and Mg in the $CaC_2$ and $Mg_2Si$.

(3) the electrodes are taken out from the molten salt, cooled to room temperature, and washed with water and dried in vacuum to obtain a composite of silicon-carbon solid sol and graphite with a silicon content of about 45%. The particle size of silicon is approximately 30 nm according to XRD.

Example 3

(1) Mg2Si powder and 3000 mesh graphite powder are mixed by planetary ball milling at a molar ratio of 1:2; 2 g of the mixture is taken to prepare a porous test piece with a porosity of about 60%; and the porous test piece is combined on a molybdenum rod current collector by a molybdenum mesh and used as a cathode, and a molten salt ($CaCl_2$+NaCl) is used as a medium, calcium metal is used as an anode, a voltage between the cathode and the anode is controlled to be 0.1 V at 600° C. and maintained for more than 400 minutes, so that the C in the cathode becomes calcium carbide, and a solid-state composite electrode of calcium carbide and calcium silicide is formed.

(2) the solid-state composite electrode of calcium carbide and calcium silicide is used as an anode, a molybdenum mesh electrode is used as a cathode, and a molten salt ($CaCl_2$)+NaCl) at 550° C. is used as a medium, a voltage of 0.5 V is applied between the anode and the cathode for electrolysis for more than 8 hours to dissolve out metals Ca and Mg in the $CaC_2$ and $Mg_2Si$.

Figure 1:
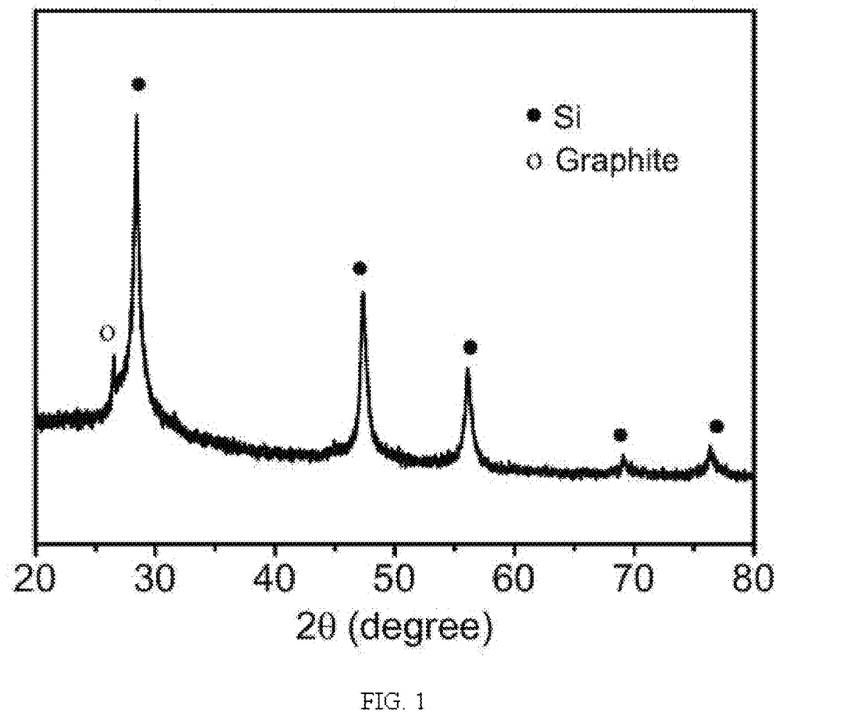
FIG. 1 is an XRD pattern of a silicon-carbon solid sol prepared in Example 3 of the present disclosure.

(3) the electrodes are taken out from the molten salt, cooled to room temperature, and washed with water and dried in vacuum to obtain a composite of silicon-carbon solid sol and graphite with a silicon content of about 60%. The particle size of silicon is approximately 30 nm according to XRD (as shown FIG. 1).

Example 4

(1) Si powder with a particle size of about 2 μm and 8000 mesh graphite powder are mixed by planetary ball milling at a mass ratio of 6:4 for 1 hour; 1 g of the mixture is taken to prepare a porous test piece with a porosity of about 70%; and the porous test piece is combined on a molybdenum rod current collector by a molybdenum mesh and used as a cathode, and a molten salt ($CaCl_2$+NaCl) is used as a medium, calcium metal is used as an anode, a voltage between the cathode and the anode is controlled to be 0.1V at 600° C. and maintained for more than 400 minutes, so that the cathode becomes a solid-state composite electrode of calcium carbide and calcium silicide.

(2) the solid-state composite electrode of calcium carbide and calcium silicide is used as an anode, the calcium metal is used as a cathode, and a molten salt ($CaCl_2$+NaCl) at 550° C. is used as a medium, a voltage of 2.0 V is applied between the anode and the cathode to react for more than 300 minutes to dissolve out metal Ca in the calcium carbide and calcium silicide.

Figure 2:
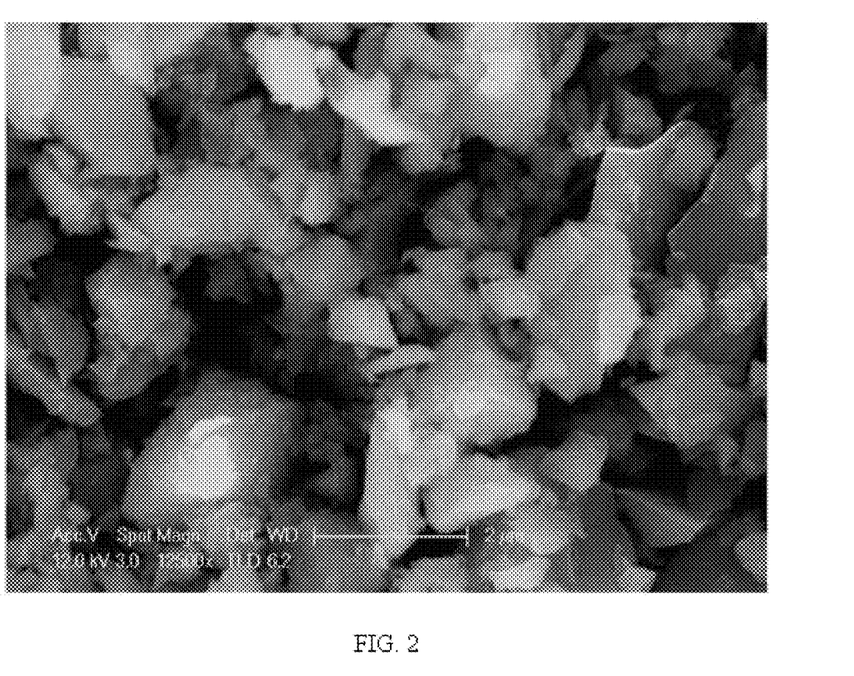
FIG. 2 is an SEM image of a mixture of silicon and graphite before reaction in Example 4 of the present disclosure.
Figure 3:
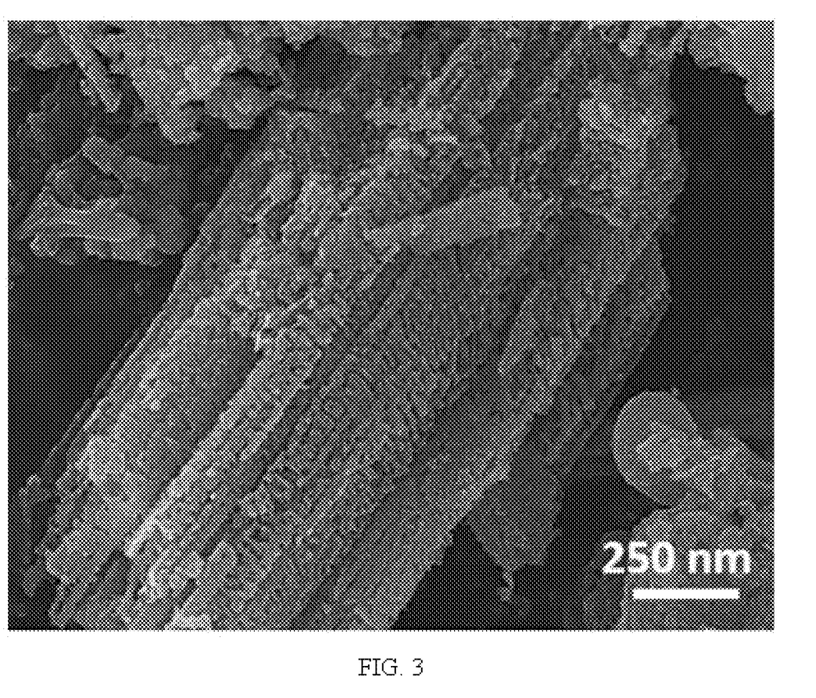
FIG. 3 is an SEM image of the silicon-carbon solid sol prepared after the reaction in Example 4 of the present disclosure.
Figure 4:
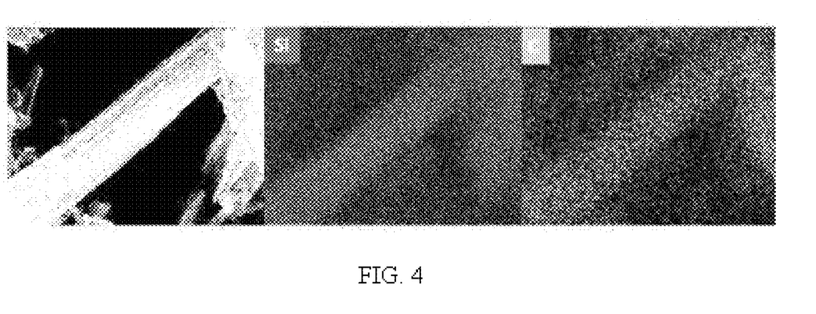
FIG. 4 is a distribution diagram of Si and C elements in the silicon-carbon solid sol prepared after the reaction in Example 4 of the present disclosure.
Figure 5:
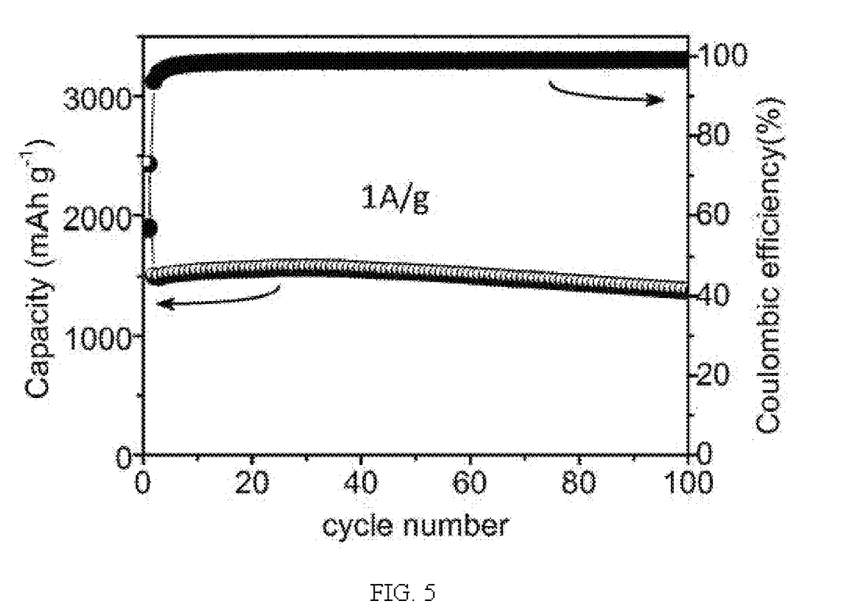
FIG. 5 is a graph showing the cycle performance of the silicon-carbon solid sol prepared in Example 4 of the present disclosure as a lithium battery anode.

(3) the electrodes are taken out from the molten salt, cooled to room temperature, and washed with water and dried in vacuum to obtain a rod cluster shaped silicon-carbon solid sol. The particle size of silicon is approximately 30 nm according to XRD. The SEM images of the raw material and test piece are shown in FIGS. 2-3. A uniform element distribution in the product is shown in FIG. 4. The nano porous silicon powder prepared in this example is used as a lithium battery anode material, and its cycle performance is shown in FIG. 5, which shows a high cycle capacity and good cycle stability.

Example 5

(1) Si powder with a particle size of about 2 μm and 8000 mesh graphite powder are mixed by planetary ball milling at a mass ratio of 6:4 for 1 hour; 1 g of the mixture is taken to prepare a porous test piece with a porosity of about 70%; and the porous test piece is combined on a molybdenum rod current collector by a molybdenum mesh and used as a cathode, and a molten salt ($CaCl_2$+NaCl) is used as a medium, calcium metal is used as an anode, a voltage between the cathode and the anode is controlled to be 0.1V at 550° C. and maintained for more than 400 minutes, so that the cathode becomes a solid-state composite electrode of calcium carbide and calcium silicide.

(2) the solid-state composite electrode of calcium carbide and calcium silicide is used as an anode, the calcium metal is used as a cathode, and a molten salt ($CaCl_2$+NaCl) at 550° C. is used as a medium, a voltage of 2.8 V is applied between the anode and the cathode to react for more than 200 minutes to dissolve metal Ca in the calcium carbide and calcium silicide.

Figure 6:
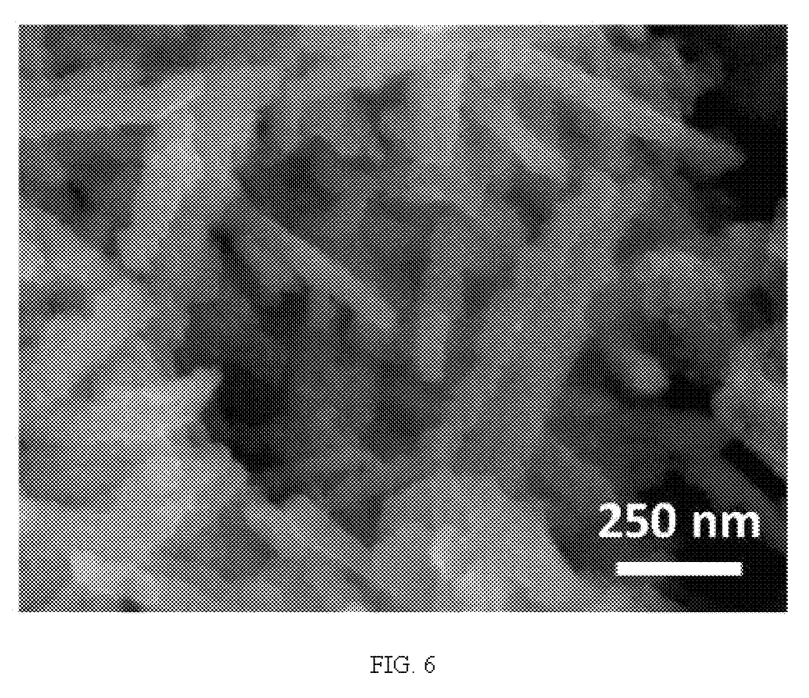
FIG. 6 is an SEM image of the silicon-carbon solid sol prepared after the reaction in Example 5 of the present disclosure.

(3) steps (1) and (2) are repeated for 1-2 times, the electrodes are taken out from the molten salt, cooled to room temperature, and washed with water and dried in vacuum to obtain a silicon-carbon solid sol nanowire with a basic unit which is 50-100 nm in diameter and 600-1000 nm in length, wherein the particle size of silicon is about 10-20 nm according to XRD. The SEM image of the silicon-carbon solid sol prepared after the reaction is shown in FIG. 6.

Example 6

In a set of comparative experiments, Si with a particle size of about 2, 5, and 10 jam is respectively mixed with graphite powder, carbon black XC72, activated carbon, graphene, graphene oxide, and carbon nanotubes by planetary ball milling at a mass ratio of 6:4 for 0.5-2 hours; 1 g of each mixture is taken to prepare a porous test piece with a porosity of about 70%; and the porous test piece is combined on a molybdenum rod current collector by a molybdenum mesh and used as a cathode, and a molten salt ($CaCl_2$+NaCl) is used as a medium, calcium metal is used as an anode, a voltage between the cathode and the anode is controlled to be 0.1V at 600° C. and maintained for more than 400 minutes to make Si and C react with Ca, so that the cathode becomes a solid-state composite electrode of calcium carbide and calcium silicide.

(2) the solid-state composite electrode of calcium carbide and calcium silicide is used as an anode, the calcium metal is used as a cathode, and a molten salt ($CaCl_2$+NaCl) at 550° C. is used as a medium, a voltage of 1.5 V is applied between the anode and the cathode to react for 200 minutes to dissolve out metal Ca in the calcium carbide and calcium silicide.

(3) steps (1) and (2) are repeated for 0-3 times, the electrodes are taken out from the molten salt, cooled to room temperature, and washed with water and dried in vacuum to obtain a silicon-carbon solid sol, a morphology of which includes particle, rod clusters, and nanorod. The particle size of silicon is between 5-50 nm.

Example 7

Si powder with a particle size of about 5 μm and coke are mixed by ball milling at a mass ratio of 8:2; 1 g of the mixture is taken to prepare a porous test piece with a porosity of about 70%; and the porous test piece is combined on a molybdenum rod current collector by a molybdenum mesh and used as a cathode, and a molten salt ($BaCl_2$+KCl) is used as a medium, Ba metal is used as an anode, a voltage between the cathode and the anode is controlled to be 0.1V at 700° C. and maintained for more than 300 minutes to make Si and C react with Ba, so that the cathode becomes a solid-state composite electrode of barium carbide and barium silicide.

(2) the solid-state composite electrode of barium carbide and barium silicide is used as an anode, nickel foam is used as a cathode, and a molten salt ($BaCl_2$+KCl) at 700° C. is used as a medium, a voltage of 1.5 V is applied between the anode and the cathode for 200 minutes to dissolve out Ba in the Ba—Si and Ba—C.

(3) the electrodes are taken out from the molten salt, cooled to room temperature, and washed with water and dried in vacuum to obtain a silicon-carbon solid sol.

Example 8

(1) Si powder with a particle size of about 2 μm is reacted with Li to form lithium silicide, the lithium silicide is mixed with 3000 mesh graphite powder by high-energy ball milling at a mass ratio of 4:6; 1 g of the mixture is taken to prepare a Li—Si—C solid composite porous test piece with a porosity of about 50%; and the Li—Si—C solid composite porous test piece is combined on a molybdenum rod current collector by a molybdenum mesh and used as a cathode, and a molten salt (LiBr—LiCl—LiF) is used as a medium, Li metal is used as an anode, a voltage between the cathode and the anode is controlled to be 0.01V at 400° C. and maintained for 100 minutes.

(2) in the above 400° C. electrolyte, the Li—Si—C alloy is used as the anode and the metal Li is used as an cathode, a voltage of 2.2V is applied for 200 minutes to dissolve out Li in the Li—Si and Li—C alloys.

(3) the electrodes are taken out from the molten salt, cooled to room temperature, and washed with water and dried in vacuum to obtain a silicon-carbon solid sol with a silicon content of about 80%.

Example 9

(1) Si powder with a particle size of about 2 μm and 8000 mesh graphite powder are mixed by planetary ball milling at a mass ratio of 6:4 for 1 hour; 1 g of the mixture is taken to prepare a porous test piece with a porosity of about 70%; and the porous test piece is combined on a molybdenum rod current collector by a molybdenum mesh and used as a cathode, and a molten salt ($CaCl_2$+NaCl) is used as a medium, calcium metal is used as an anode, a 2 A/g cathode current is applied to the cathode at 550° C. and maintained for more than 400 minutes to make Si and graphite react with Ca, so that the cathode becomes a solid-state composite electrode of calcium carbide and calcium silicide.

(2) the solid-state composite electrode of calcium carbide and calcium silicide is used as an anode, the calcium metal is used as a cathode, and a molten salt ($CaCl_2$+NaCl) at 550° C. is used as a medium, an anode current of 5 A/g is applied to the anode at 550° C. and maintained for 100 minutes to dissolve out the Ca in the Ca—Si and Ca—C alloy.

(3) steps (1) and (2) are repeated for 1 time, the electrodes are taken out from the molten salt, cooled to room temperature, and washed with water and dried in vacuum to obtain a silicon-carbon solid sol nanowire with a basic unit which is 60 nm in diameter and 500 nm in length.

Example 10 boron-doped Si powder with a particle size of about 2 μm and graphite powder with 8000 meshes are mixed by planetary ball milling at a mass ratio of 6:4 for 1 hour; 1 g of the mixture is taken to prepare a porous test piece with a porosity of about 70%; and the porous test piece is combined on a molybdenum rod current collector by a molybdenum mesh and used as a cathode, and a molten salt ($CaCl_2$+NaCl) is used as a medium, calcium metal is used as an anode, Ag/AgCl is used as reference electrode, a potential of the cathode is controlled 0.3 V higher than the deposition potential of Ca at 550° C. and maintained for 600 minutes to make Si and graphite react with Ca, so that the cathode becomes a solid-state composite electrode of calcium carbide and calcium silicide.

the solid-state composite electrode of calcium carbide and calcium silicide is used as an anode, the calcium metal is used as a cathode, and a molten salt ($CaCl_2$+NaCl) at 550° C. is used as a medium, an anode current of 3 A/g is applied to the anode at 550° C. to react until the voltage reaches 2.7 V, so that the Ca in the anode is dissolved out.

(3) the electrodes are taken out from the molten salt, cooled to room temperature, and washed with water and dried in vacuum to obtain a silicon-carbon solid sol.

Example 11 boron-doped Si powder with a particle size of about 2 μm and graphite powder with 8000 meshes are mixed by planetary ball milling at a mass ratio of 6:4 for 1 hour; 1 g of the mixture is taken to prepare a porous test piece with a porosity of about 70%; and the porous test piece is combined on a molybdenum rod current collector by a molybdenum mesh and used as a cathode, and a molten salt ($CaCl_2$+NaCl) is used as a medium, calcium metal is used as an anode, a potential difference between the cathode and the anode is controlled to be 0.3 V at 950° C., and react for 600 minutes to make Si and graphite react with Ca, so that the cathode becomes a solid-state composite electrode of calcium carbide and calcium silicide.

(2) the solid-state composite electrode of calcium carbide and calcium silicide is used as an anode, a nickel foam is used as a cathode, and a molten salt ($CaCl_2$+NaCl) at 550° C. is used as a medium, an anode current of 0.5 A/g is applied to the anode at 550° C. to dissolve out Ca in the anode.

(3) the electrodes are taken out from the molten salt, cooled to room temperature, and washed with water and dried in vacuum to obtain a silicon-carbon solid sol.

Example 12

(1) boron-doped Si powder with a particle size of about 2 μm and graphite powder with 8000 meshes are mixed by planetary ball milling at a mass ratio of 5:5 for 1 hour; 1 g of the mixture is taken to prepare a porous test piece with a porosity of about 80%; and the porous test piece is combined on a molybdenum rod current collector by a molybdenum mesh and used as a cathode, and a molten salt ($BaCl_2$+NaCl+KCl) is used as a medium, BaZn liquid metal is used as an anode, a potential difference between the cathode and the anode is controlled to be 0.0 V at 600° C., and react for 600 minutes to make Si and graphite react with Ba, so that the cathode becomes a solid-state composite electrode of barium carbide and barium silicate.

(2) the solid-state composite electrode of barium carbide and barium silicate is used as an anode, a BaZn Liquid metal is used as a cathode, and a molten salt ($BaCl_2$+NaCl+KCl) at 550° C. is used as a medium, an anode current of 0.15 A/g is applied to the anode at 600° C. to react until the voltage reached 2.7 V, so that Ba in the anode is dissolved out.

(3) the electrodes are taken out from the molten salt, cooled to room temperature, and washed with water and dried in vacuum to obtain a silicon-carbon solid sol.

Example 13

(1) Si powder with a particle size of about 2 μm is reacted with Li to form lithium silicide, the lithium silicide is mixed with 3000 mesh graphite powder by high-energy ball milling at a mass ratio of 4:6; 1 g of the mixture is taken to prepare a Li—Si—C solid composite porous test piece with a porosity of about 50%; and the Li—Si—C solid composite porous test piece is combined on a molybdenum rod current collector by a molybdenum mesh and used as a cathode, and a molten salt (LiBr—RbBr) is used as a medium, Li metal is used as an anode, a voltage between the cathode and the anode is controlled to be 0.01V at 300° C. and maintained for 100 minutes.

(2) in the above 300° C. electrolyte, the Li—Si—C alloy is used as the anode and the metal Li is used as an cathode, an anode current of 9 A/g to the anode to react until the voltage reaches 2.8V, so that Li in Li—Si and Li—C alloys is dissolved out.

(3) the electrodes are taken out from the molten salt, cooled to room temperature, and washed with water and dried in vacuum to obtain a silicon-carbon solid sol.

Example 14

(1) boron-doped Si powder with a particle size of about 2 µm and graphite powder with 8000 meshes are mixed by planetary ball milling at a mass ratio of 1:9 for 1 hour; 1 g of the mixture is taken to prepare a porous test piece with a porosity of about 80%; and the porous test piece is combined on a molybdenum rod current collector by a molybdenum mesh and used as a cathode, and a molten salt ($BaCl_2$+NaCl+KCl) is used as a medium, BaZn liquid metal is used as an anode, a potential difference between the cathode and the anode is controlled to be 0.0 V at 600° C., and react for 600 minutes to make Si and graphite react with Ba, so that the cathode becomes a solid-state composite electrode of barium carbide and barium silicate.

(2) the solid-state composite electrode of barium carbide and barium silicate is used as an anode, a BaZn liquid metal is used as a cathode, and a molten salt ($BaCl_2$+NaCl+KCl) at 550° C. is used as a medium, an anode current of 1 A/g is applied to the anode at 600° C. to react until the voltage reached 2.8 V, so that Ba in the anode is dissolved out.

(3) the electrodes are taken out from the molten salt, cooled to room temperature, and washed with water and dried in vacuum to obtain a silicon-carbon solid sol.

Example 15

(1) boron-doped Si powder with a particle size of about 2 µm and graphite powder with 300 meshes are mixed by planetary ball milling at a mass ratio of 6:4 for 1 hour; 1 g of the mixture is taken to prepare a porous test piece with a porosity of about 70%; and the porous test piece is combined on a molybdenum rod current collector by a molybdenum mesh and used as a cathode, and a molten salt ($CaCl_2$+NaCl+KCl) is used as a medium, calcium metal is used as an anode, a potential difference between the cathode and the anode is controlled to be 0.0 V at 500° C. for more than 10 hours, so that the cathode becomes a solid-state composite electrode of calcium carbide and calcium silicate.

(2) the solid-state composite electrode of calcium carbide and calcium silicate is used as an anode, calcium metal is used as a cathode, and a molten salt ($CaCl_2$+NaCl+KCl) at 750° C. is used as a medium, a voltage of 2.0 V is applied between the anode and the cathode and maintained for more than 300 minutes to dissolve out the Ca in the calcium carbide and calcium silicate.

(3) the electrodes are taken out from the molten salt, cooled to room temperature, and washed with water and dried in vacuum to obtain a B-doped silicon-carbon solid sol.

Example 16

(1) P-doped Si powder with a particle size of about 2 µm and graphite powder with 300 meshes are mixed by planetary ball milling at a mass ratio of 6:4 for 1 hour; 1 g of the mixture is taken to prepare a porous test piece with a porosity of about 70%; and the porous test piece is combined on a molybdenum rod current collector by a molybdenum mesh and used as a cathode, and a molten salt ($CaCl_2$+NaCl+KCl) is used as a medium, calcium metal is used as an anode, a potential difference between the cathode and the anode is controlled to be 0.2 V at 500° C. for more than 10 hours, so that the cathode becomes a solid-state composite electrode of calcium carbide and calcium silicate.

(2) the solid-state composite electrode of calcium carbide and calcium silicate is used as an anode, calcium metal is used as a cathode, and a molten salt ($CaCl_2$+NaCl+KCl) at 500° C. is used as a medium, a voltage of 2.0 V is applied between the anode and the cathode and maintained for more than 300 minutes to dissolve out the Ca in the calcium carbide and calcium silicate.

(3) the electrodes are taken out from the molten salt, cooled to room temperature, and washed with water and dried in vacuum to obtain a P-doped silicon-carbon solid sol.

The above are the preferred embodiments of the present disclosure and do not limit the protection scope of the present disclosure. It should be pointed out that for those of ordinary skill in the art, improvements and changes can be made without departing from the principle of the present disclosure, and these improvements and changes shall be within the protection scope of the present disclosure.

What is claimed is:

1. A highly dispersed silicon-carbon solid sol, wherein the silicon is a dispersed substance, the carbon is a dispersion medium, and the silicon is covered by a continuous carbon layer or buried in a continuous carbon phase; a size of the silicon is less than 80 nm at least in one of dimensions, and a mass percentage of the silicon in the highly dispersed silicon-carbon solid sol is 5% to 90%.

2. The highly dispersed silicon-carbon solid sol of claim 1, wherein the silicon is at least one of nanoparticle, one-dimensional nanowire, and two-dimensional nanosheet; and a morphology of the highly dispersed silicon-carbon solid sol is at least one of nanoparticle, microparticle, rod, and rod cluster.

3. The highly dispersed silicon-carbon solid sol of claim 1, wherein the size of the silicon in one of the dimensions is between 3 and 60 nm.

4. A method for preparing the highly dispersed silicon-carbon solid sol of claim 1, comprising following steps:
   (1) preparing a solid-state composite electrode of metal carbide M1C and metal silicide M2Si;
   (2) performing an anodic polarization to the solid-state composite electrode of metal carbide M1C and metal silicide M2Si under a condition of 300-750° C. to dissolve metals M1 and M2 in the metal carbide M1C and metal silicide M2Si; wherein a molten salt containing alkali halide or alkaline earth halide or a mixture of the alkali halide and the alkaline earth halide is used as an electrolyte;
   (3) repeating steps (1) and (2) in sequence, taking out the polarized electrode, and removing residual molten salt to obtain the highly dispersed silicon-carbon solid sol.

5. The method for preparing the highly dispersed silicon-carbon solid sol of claim 4, wherein in the step (1), a method for preparing the solid-state composite electrode of metal carbide M1C and metal silicide M2Si is any one of the following (i)-(vi):
   (i) mixing the M1C and M2Si, molding the mixture, and preparing the solid-state composite electrode by combining a molded body with a conductive current collector;
   (ii) mixing the M1C and Si, molding the mixture, and performing a cathodic polarization to a molded body at 300-950° C. in a molten salt containing metal M2 halide to make Si react with M2 ions to obtain the solid-state composite electrode of metal carbide M1C and metal silicide M2Si;

(iii) mixing the C and M2Si, molding the mixture, and performing a cathodic polarization to a molded body at 300-950° C. in a molten salt containing metal M1 halide to make C react with M1 ions to obtain the solid-state composite electrode of metal carbide M1C and metal silicide M2Si;

(iv) mixing the M1C and Si and then chemically combining with M2, molding the combination, and preparing the solid-state composite electrode by combining a molded body with a conductive current collector;

(v) mixing the C and M2Si and then chemically combining with Ml, molding the combination, and preparing the solid-state composite electrode by combining a molded body with a conductive current collector;

(vi) mixing the C and Si and then chemically combining with M, molding the combination, and preparing the solid-state composite electrode by combining a molded body with a conductive current collector; or mixing the C and Si, molding the mixture, and performing a cathodic polarization to a molded body at 300-950° C. in a molten salt containing metal M halide to make the C and Si react with M ions to obtain the solid-state composite electrode of metal carbide MC and metal silicide MSi; where M is M1 and/or M2.

6. The method for preparing the highly dispersed silicon-carbon solid sol of claim 5, wherein in the cathodic polarization of methods (ii-iii) and (vi), an anode is graphite or corresponding elementary substance or alloy of M1 and M2; a cathode potential is controlled to be 0-0.3V relative to an evolution potential of the metals M1 and M2, or when a constant current polarization is adopted, a polarization current is 0.1-10A/g.

7. The method for preparing the highly dispersed silicon-carbon solid sol of claim 5, wherein in the method (i)-(vi), the molded body is obtained by the following preparation method: directly preparing the mixture into a porous body or preparing a porous body after mixing the mixture with an additive, the additive being any one of conductive metal powder, carbon material powder, elementary substance or compound of Groups IIIA-VIA elements of the periodic table of elements, and solid component of the molten salt; in the methods (i) and (iv)-(vi), the conductive current collector is one of nickel, iron, titanium, molybdenum, and tungsten or an alloy containing any one of these elements.

8. The method for preparing the highly dispersed silicon-carbon solid sol of claim 4, wherein in the steps (1) to (3), the metal M1 is at least one of Li, Ca, Ba, Sr; the metal M2 is at least one of Li, Mg, Ca, Ba, Sr, and rare earth.

9. The method for preparing the highly dispersed silicon-carbon solid sol of claim 5, wherein the C comprises at least one of graphite, amorphous carbon, carbon nanotubes, graphene, and graphene oxide; the Si is silicon elementary substance or doped silicon.

10. The method for preparing the highly dispersed silicon-carbon solid sol of claim 4, wherein in the step (2), a cathode is a conductive metal, and when an anode is polarized, a voltage of 0.5-2.8 V is applied between the anode and the cathode or when a constant current polarization is adopted, a polarization current is 0.1-10A/g;

in the step (3), the method of removing the residual molten salt comprises: removing the residual molten salt by washing with water or pickling, or removing the residual molten salt by distilling in inert atmosphere or vacuum.

11. The method for preparing the highly dispersed silicon-carbon solid sol of claim 10, wherein the conductive metal is an elementary substance or an alloy of corresponding metals M1 and M2.

12. An application of the highly dispersed silicon-carbon solid sol of claim 1 as an anode material of lithium ion battery.

* * * * *